United States Patent Office 3,182,646
Patented May 11, 1965

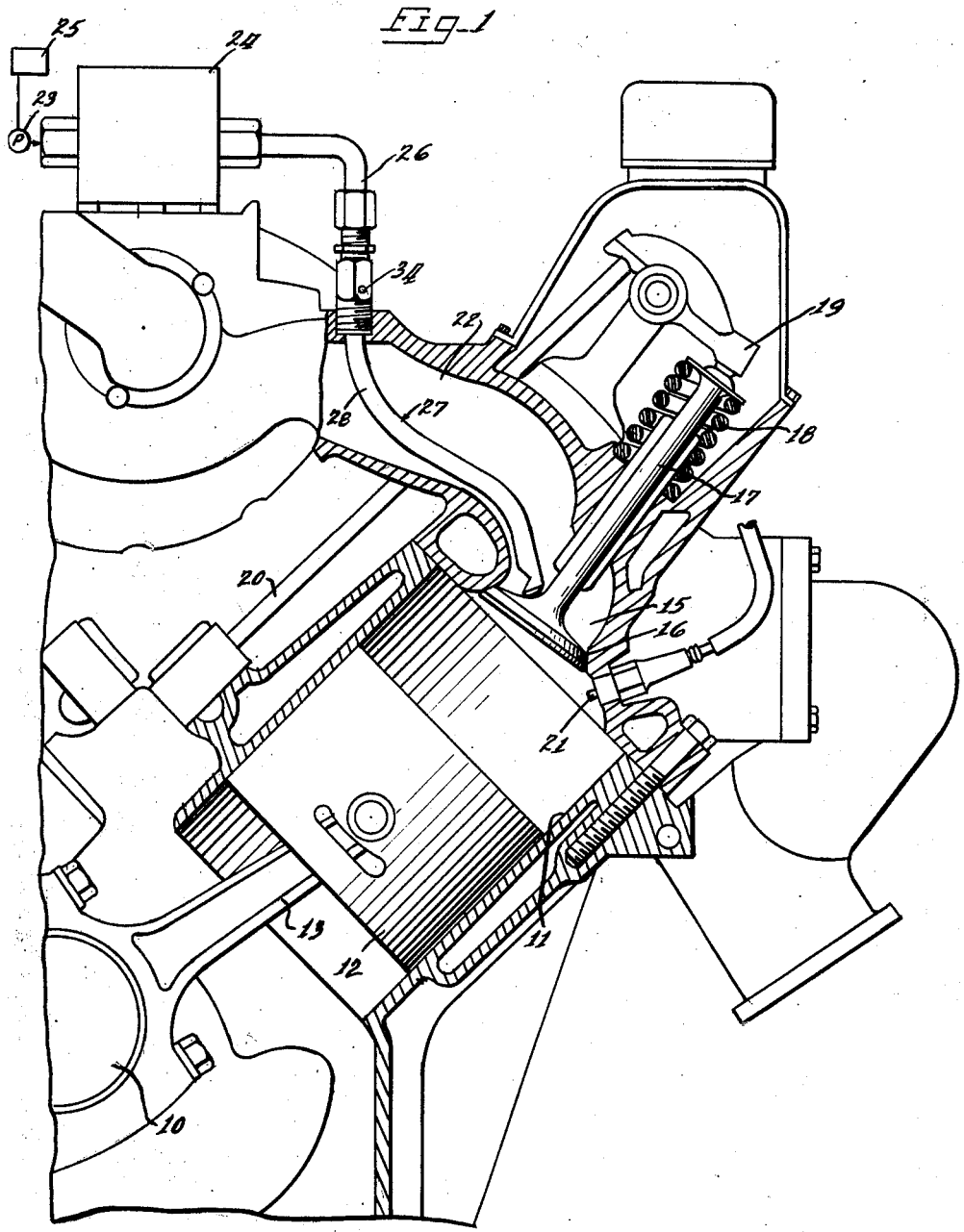

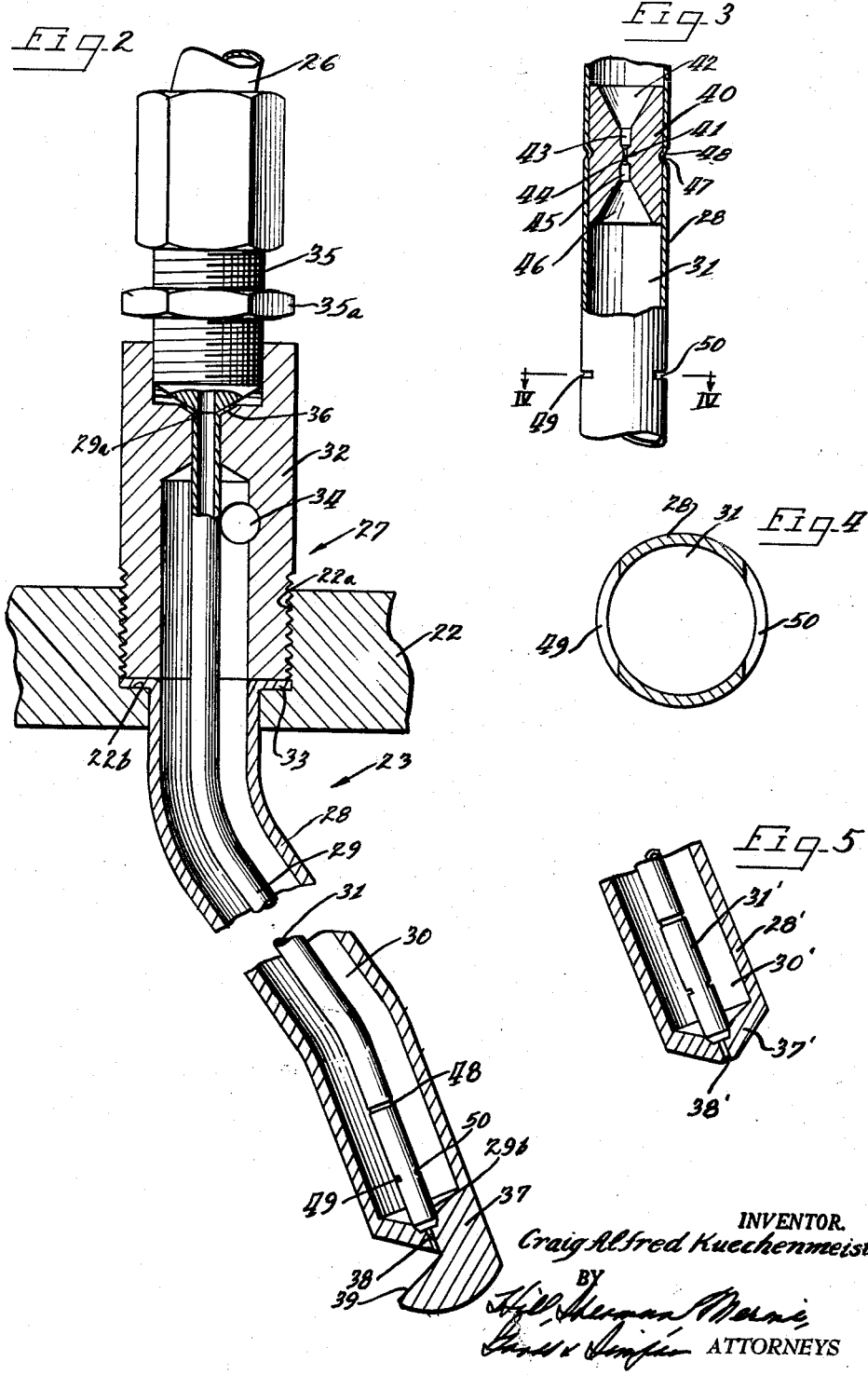

3,182,646
AIR-BLED COAXIAL INJECTOR
Craig Alfred Kuechenmeister, Box 295-B, Rte. 1,
Manistee, Mich.
Filed June 15, 1961, Ser. No. 117,318
9 Claims. (Cl. 123—119)

The present invention relates to an improved mechanism for delivering a flow of fuel to a four cycle internal combustion engine and more particularly relates to an improved fuel injection mechanism.

The present invention contemplates the provision of a fuel delivery system having a fuel injector mechanism for supplying fuel preferably directly adjacent an intake valve of a four cycle internal combustion engine. The injection mechanism embodies a first elongated tube of a yieldable material forming an air conduit for extending through an air intake manifold of the engine to an injection point with the conduit having an air intake opening outside of the manifold and being closed to the manifold interior. A second elongated yieldable tube extends coaxially inside of the first tube and forms a fuel conduit within the air conduit having a pressure fuel inlet connected to the fuel pump, and a fuel discharge end which seats against a wall at the end of the first tube containing a fuel atomizing nozzle opening. A restriction is positioned in the second tube upstream of the atomizing nozzle and aligned therewith to direct a relatively high velocity stream of fuel to the atomizing nozzle, and an air opening is provided in the fuel conduit for the intake of air for mixing with fuel particularly at idle speeds of the engine. The injection mechanism is particularly well adapted to use with a constant delivery system wherein the constant flow from the fuel pump is controlled and metered, but features of the invention may also be employed with an intermittent release fuel mechanism wherein fuel is released for each intake stroke of the engine cylinder to which fuel is delivered.

An object of the present invention is to provide a fuel injection system employing an injector mechanism of improved design which provides an improved fuel flow to an engine at all operating ranges and which is of simplified construction and can be used in existing engines or in newly designed engine constructions.

A further object of the invention is to provide an improved fuel injector wherein fuel can be conveniently delivered or injected directly at the intake port of an engine cylinder and wherein the problem of fuel condensation on the intake manifold is avoided and wherein the disadvantages encountered due to the distance from the injector to the intake valve in conventional systems are avoided.

A further object of the invention is to provide a mechanism which overcomes the problems of injector heating and particularly utilizes an air cooling jacket for insulating the injector conduits from ambient heat.

A still further object of the invention is to provide an improved construction for the injection of fuel at low pressure idling, utilizing an air mixing operation at idling speeds which is reduced at increased throttle openings.

Other objects and advantages and features will become more apparent with the teaching of the principles of the invention in connection with the disclosure of the preferred embodiment thereof in the specification, claims and drawings, in which:

FIGURE 1 is a fragmentary vertical sectional view of an internal combustion engine with the section taken through one of the cylinders, illustrating a fuel injection mechanism embodying the principles of the present invention;

FIGURE 2 is an enlarged detailed vertical sectional view of the fuel injection mechanism;

FIGURE 3 is a fragmentary elevational view with portions broken away illustrating the fuel injection nozzle portion on the injector;

FIGURE 4 is a horizontal sectional view taken substantially along line IV—IV of FIGURE 3; and FIGURE 5 is a fragmentary sectional view illustrating another form of the lower end of the tubes which form part of the injection mechanism.

As shown on the drawings:

FIGURE 1 illustrates a portion of a four cycle internal combustion engine having a crank shaft 10 and cylinders 11 with pistons 12 therein connected to connecting rods 13 on the crank shaft 10. Fuel is taken into the cylinder through an intake port 15 controlled by a poppet valve 16 with its stem 17 slidably mounted in the engine head. A valve spring 18 urges the valve toward closed position, and it is opened by a rocker arm 19 operated by a push rod 20 driven by a cam shaft, not shown. The engine is of a conventional construction and its elements and operation will be fully appreciated by those skilled in the art so that certain parts may be omitted and not described or shown in detail. Ignition of the fuel in the cylinder is accomplished through a spark plug 21 and the engine is provided with a conventional intake manifold 22. The intake manifold may be normally aspirated or may be supercharged.

Fuel is supplied through an injection mechanism 27 embodying the principles of the invention, and while the injection mechanism is particularly well adapted to the environment of the type of engine illustrated, it will be understood that the features of the invention may be employed to advantage in other uses.

The fuel injection mechanism, as illustrated in FIGURES 1 through 4, includes a first tube 28 which is rigidly mounted on a wall of the intake manifold 22 and which extends to an injection point at its lower end adjacent the poppet valve 16 at the cylinder intake port 15. This first tube 28 forms an air flow conduit and supplies mixing air to mix with the fuel particularly at low speeds, for atomizing the fuel. Of course the operating air for the cylinder 11 flows into the cylinder in the usual manner through the intake manifold 22 from an entrance opening, not shown.

The first tube 28 is yieldable in nature so that it can be shaped or bent to a degree to extend to the injection point at the intake port 15 for the cylinder. In this manner, the fuel injection mechanism may be mounted in pairs and individually bent and extended to their respective intake ports. Also, a standard length tube 28 may be provided for existing engines and mounted on existing engines by drilling and threading holes and shaping to extend to the intake ports.

Within the first tube 28 is a second tube 29 which forms a fuel conduit coaxial within said air conduit. The second tube 29 is similarly yieldable so that it can be shaped with the first tube. The coaxial position of the second tube 29 forms an annular surrounding air jacket or passage 30 around it which insulates it from engine temperatures and from air within the intake manifold 22.

The second tube 29 is hollow to form a fuel flow conduit 31 therein and has a pressure fuel inlet at its upper end 29a and is open at its lower end 29b to form a discharge end.

A threaded fitting 32 is provided for mounting the first and second tubes 28 and 29, and the wall of the intake manifold is threaded at 22a to receive the fitting 32 and the threaded opening is continued with an opening of a smaller size to form a shoulder 22b against which seats the outwardly flared upper end 33 of the first tube 28. It will of course be appreciated that various forms of mountings may be employed although advantages accrue from the arrangement shown in simplicity of adaptation and removal for repair or replacement.

The fitting is drilled through its center and has a tapered upwardly facing seat 36 to receive the outwardly flared upper end 29a of the second tube 29 for supporting it. A coupling 35 is threaded into the fitting 32 to hold the second tube 29 against its seat 36.

For the entry of air into the air conduit 30, the fitting 32 is provided with a laterally extending bore 34 which intersects the air conduit 30 and is substantially at right angles thereto. The bore 34 opens to atmospheric air so as to be at atmospheric pressure and air will flow in through the opening when a pressure differential exists due to decreased pressures within the intake manifold 22.

Fuel is supplied through a line 26 connected to the coupling 35 and the coupling 35 is provided with a wrench surface 35a which permits tightening onto the top of the flange 36. The fuel line 26 leads from a fuel block 34 which is supplied with fuel from a pump 23 connected to a fuel tank 25. It is contemplated that the preferred operation of the injection mechanism 27 will be with fuel delivery at a continual flow. The fuel block 24 may operate as a metering mechanism and as a convenient connection for the other injection lines. Metering may also be accomplished at the pump 23. In some circumstances however, the injection mechanism may be utilized with different types of fuel supply elements and intermittent fuel supply may be employed with the use of a distributor.

It is also contemplated that the injection mechanism may be employed with a system wherein the pressure of the fuel supply may be varied. It is also possible to supply air under pressure to the bore 34 varying the pressure to control the flow of injection mixing air.

The fuel flows down through the fuel conduit 31 and at its lower end 29b the second tube 29 seats against an end wall 37 across the lower end of the first tube. The end wall is provided with an atmoizing nozzle orifice 38 which opens into the intake manifold. In the arrangement of FIGURE 2 the end wall 37 is provided with a lip which forms an angularly extending surface 39 to be engaged and to help diffuse the fuel as it leaves the injection or atomizing nozzle orifice 38.

In the arrangement of FIGURE 5, the surface 39 is omitted so that the injection nozzle 38' injects fuel directly into the engine intake port without engaging a diffusing or dispersing surface. The other structure of FIGURE 5 is the same as the arrangement of FIGURE 2, and includes a first tube 28' with a second fuel tube 31' therein forming an air passage 30' outwardly thereof, and with the first conduit having an end wall 37' with the injection or atomizing orifice 38' formed axially therethrough.

Fuel is delivered to the injection or atomizing orifice 38 in a relatively high velocity stream generated by a restriction 40 in the fuel passage 31. The restriction 40 is in the form of a plug inserted into the tube 29 and locked therein.

The plug 40 has a fuel nozzle orifice 41 formed therein formed by a series of counterbored holes and at the upper end is a first conical entrance passage 42 leading to another passage 43 which diminishes to a minimum size passage 44 that forms the stream of high velocity fuel directed to the injection orifice 38. For this purpose the fuel orifice 41 is aligned with the injection orifice 38 and the tube 29 is straight between the two orifices. Downstream of the fuel orifice 44 is a slightly larger counter board 45 and a tapered counter board 46.

The plug 40 is conveniently locked into place in the tube 28 by being provided with an annular recessed groove 47, and the material of the tube being pressed into the groove at 48.

Injection mixing air is bled into the fuel passage 31 at a location between the fuel orifice 41 and the injection orifice 38. For this purpose lateral ports 49 and 50 are formed into the side of the tube 29. These may be formed in various ways but are conveniently and preferably formed by lateral saw cuts formed by an abrasive wheel or a saw having its axis parallel to the axis of the tube 29 and with the cuts formed in each side of the tube.

Thus, a fine high velocity stream of fuel will emerge from the orifice 44 and engage the injection orifice 38 with air flowing around it. The air will also flow out through the injection or atomizing orifice 38 to mix with the fuel at that location and increase atomization. This mixing and the entry of air through the ports 49 and 50 for increased atomization is of importance and adds to the efficiency of the engine at idling speeds. At idling speeds the engine throttle will be closed and intake manifold vacuum will be high increasing the flow of air. Fuel pressures will be low and quantities delivered will be at a minimum thereby increasing the problems of atomization, but with the air mixing arrangement shown, these problems are largely eliminated. At high speeds of the engine and at open throttle positions the flow of mixing air through the ports 49 and 50 the flow of air diminishes to a minimum and is substantially terminated.

Thus it will be seen that I have provided an improved fuel injection mechanism which meets the objectives and advantages and features above set forth. The mechanism is unusually simple in construction and eliminates the expense of fine tolerance injection mechanisms heretofore necessary and it obtains the advantages of fuel injection.

The injection mechanism is effective for all ranges of speed operation, and at low speeds or low fuel pressures wherein the fuel emerging from the fuel jet 41 tends to lose velocity and tends to puddle at the atomizing orifice 38, good injection will still continue with the mixing of the air with the fuel and the flow of air and fuel through the atomizing injection orifice 38. The injector therefore remains efficient at low pressure idling. The injector may be of various lengths and an extremely long length injector is possible inasmuch as the fuel is mixed at the exit of the injector allowing atomization at the crucial point. Further, injection takes place directly at the entry into the cylinder eliminating disadvantages of injection into the intake manifold at spots remote from the intake valve.

It will be understood that the fuel flow orifice or nozzle may be varied in dimension in accordance with the type of fuel used (gas or liquid) and with the viscosity of the particular fuel. Where a gaseous fuel is used or where a fuel with a low flash point is employed or a highly volatile fuel, the air jacket formed by the outer tube surrounds and protects the fuel from being prematurely heated and ignited.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A fuel injection mechanism for an internal combustion engine comprising an elongated uniform diameter first tube forming an air conduit for extending through an air intake manifold to an injection point having an air intake opening outside of the manifold and being closed to the manifold interior, an elongated uniform diameter second tube substantially coaxial with the first tube forming a fuel conduit within said air conduit having a pressure fuel inlet and a discharge end, a fuel atomizing nozzle opening at the discharge end of the fuel conduit externally of the air conduit, a fuel nozzle in the fuel conduit upstream of the atomizing nozzle, an air opening in the fuel conduit between the fuel nozzle and the atomizing nozzle for the intake of air from the air conduit so that air and fuel flow through said atomizing nozzle, and means between said intake opening on the first tube and said air opening for supporting the tubes on a manifold wall.

2. A fuel injection mechanism for an internal combustion engine comprising an air conduit for extending through an air intake manifold to an injection point having an air intake opening outside of the manifold and being closed to the manifold interior, a fuel conduit within said air conduit having a pressure fuel inlet and a discharge end, a centrally located axial fuel nozzle restriction in the fuel conduit for forming a stream of fuel spaced inwardly from the sides of the fuel conduit, a lateral air opening into the fuel conduit from the air conduit downstream of the fuel nozzle, an injection nozzle restriction at the discharge end of the fuel conduit with an opening positioned in the path of the fuel stream for injecting and mixing fuel and air, and means on said tubes positioned between the air intake opening on said air conduit and the air opening in the fuel conduit for mounting said conduits on a manifold wall.

3. A fuel injection mechanism for an internal combustion engine comprising an air conduit for extending through an air intake manifold to an injection point having an air intake opening outside of the manifold and being closed to the manifold interior, a fuel conduit within said air conduit having a pressure fuel inlet and a discharge end, a centrally located axial fuel nozzle restriction in the fuel conduit for forming a stream of fuel spaced inwardly from the sides of the fuel conduit, a lateral air opening into the fuel conduit from the air conduit downstream of the fuel nozzle, an injection nozzle restriction at the discharge end of the fuel conduit with an opening positioned in the path of the fuel stream for injecting and mixing fuel and air, and a deflection surface positioned downstream of the injection nozzle restriction for receiving and diffusing fuel mixed with air flowing from the injection nozzle opening.

4. A fuel injection mechanism for an internal combustion engine comprising a first tube forming an air conduit for extending through an air intake manifold to an injection point having an air intake opening outside of the manifold and being closed to the maifold interior, a second tube within said first tube forming a fuel conduit within said air conduit having a pressure fuel inlet and a discharge end, a support fitting having a cylindrical opening receiving and surrounding said first tube, a lateral bore extending through said fitting at an angle to the axis of the first tube and intersecting the tube forming said air intake opening, a fuel atomizing nozzle opening at the discharge end of said fuel conduit externally of the air conduit, a fuel nozzle in the fuel conduit upstream of the atomizing nozzle and downstream from said support fitting, and an air opening in the fuel conduit between the fuel nozzle and atomizing nozzle for the intake of air from the air conduit so that air and fuel mix and flow through said atomizing nozzle.

5. A fuel injection mechanism for an internal combustion engine comprising an elongated uniform diameter first tube forming an air conduit for extending through an air intake manifold to an injection point having an air intake opening outside of the manifold and being closed to the manifold interior, an elongated uniform diameter second tube substantially coaxial with the first tube forming a fuel conduit within said air conduit having a pressure fuel inlet and a discharge end, a fuel atomizing nozzle opening at the discharge end of said fuel conduit externally of the air conduit, an air opening in the fuel conduit upstream of the atomizing nozzle, a cylindrical plug positioned in said second tube upstream of said air opening with a centrally located axial fuel opening for forming a high velocity fuel stream to mix with air at the injection opening, and means securing said plug in place in said second tube.

6. A fuel injection mechanism for an internal combustion engine comprising a first tube forming an air conduit for extending through an air intake manifold to an injection point having an air intake opening outside of the manifold and being closed to the manifold interior, a second tube within said first tube and forming a fuel conduit within said air conduit having a pressure fuel inlet and a discharge end, a wall in an end of the first tube with a centrally located injection orifice, the discharge end of said second tube sealingly seated against said wall so that fuel will be injected through the orifice, an air opening into the fuel conduit from the air conduit upstream of the injection orifice, and a nozzle restriction upstream of the air opening for directing fuel in a stream to the injection orifice.

7. A fuel injection mechanism for an internal combustion engine comprising an air conduit for extending through an air intake manifold to an injection point having an air intake opening outside of the manifold and being closed to the manifold interior, a fuel conduit within said air conduit having a pressure fuel inlet and a discharge end, a fuel atomizing nozzle opening at the discharge end of said fuel conduit externally of the air conduit, a fuel nozzle in the fuel conduit upstream of the atomizing nozzle for directing a stream of fuel through the fuel conduit between the fuel nozzle and atomizing nozzle, and air opening means leading into the fuel conduit from the air conduit between said nozzles for the intake of air from the air conduit so that air and fuel will mix in flowing through the atomizing nozzle, and a support upstream of said opening means for mounting said air conduit on a manifold wall.

8. A fuel injection mechanism for an internal combustion engine comprising an air conduit for extending through an intake manifold to an injection point having an air intake opening outside of the manifold and being closed to the manifold interior, a fuel conduit coextensive with and being within said air conduit having a pressure fuel inlet end and a discharge end, means on the inlet end of the conduits for mounting said conduits on a manifold wall, a restriction in said fuel conduit for forming a stream of fuel, an air inlet into the fuel conduit from the air conduit downstream of said restriction, and a fuel injection opening at the discharge end of the fuel conduit downstream of said air inlet to receive the stream of fuel from said restriction and mix the fuel with air.

9. A fuel injection mechanism for an internal combustion engine comprising an elongate tubular air conduit for extending to an intake manifold to an injection point having an air intake opening outside of the manifold and being closed to the manifold interior, a fuel conduit within said air conduit defining an annular air flow passage between the fuel conduit and air conduit and having a fuel pressure inlet end outside of the manifold and a discharge end within the manifold, an air fuel mixing means within said fuel conduit receiving air from said air conduit and positioned adjacent the discharge end of the fuel conduit, nozzle means at the discharge end of the fuel conduit downstream of the air fuel mixing means discharging a mixture of air and fuel into the manifold, and means between the intake opening on the air conduit and the nozzle means for supporting the conduit on a manifold wall.

References Cited by the Examiner

UNITED STATES PATENTS

| | | | |
|---|---|---|---|
| 1,802,848 | 4/31 | Summers. | |
| 1,822,011 | 9/31 | Chandler. | |
| 2,711,723 | 6/55 | Summers. | |
| 2,725,861 | 12/55 | Leibing. | |
| 2,968,473 | 1/61 | Mick | 261—23 |
| 2,983,491 | 5/61 | Powell et al. | 261—23 |
| 3,087,480 | 4/63 | Baudry | 123—119 |

RICHARD B. WILKINSON, *Primary Examiner.*

EUGENE F. BLANCHARD, KARL J. ALBRECHT,
*Examiners.*